US012759260B2

(12) United States Patent
Hagihara

(10) Patent No.: US 12,759,260 B2
(45) Date of Patent: Oct. 13, 2026

(54) CARBON FIBER-REINFORCED PLASTIC AND PRODUCTION METHOD THEREFOR

(71) Applicant: LINTEC Corporation, Tokyo (JP)

(72) Inventor: Yoshiaki Hagihara, Tokyo (JP)

(73) Assignee: LINTEC Corporation, Tokyo (JP)

( * ) Notice: Subject to any disclaimer, the term of this patent is extended or adjusted under 35 U.S.C. 154(b) by 201 days.

(21) Appl. No.: 18/264,892

(22) PCT Filed: Jan. 27, 2022

(86) PCT No.: PCT/JP2022/003096
§ 371 (c)(1),
(2) Date: Aug. 9, 2023

(87) PCT Pub. No.: WO2022/172765
PCT Pub. Date: Aug. 18, 2022

(65) Prior Publication Data
US 2024/0123703 A1 Apr. 18, 2024

(30) Foreign Application Priority Data
Feb. 12, 2021 (JP) ................................ 2021-021036

(51) Int. Cl.
*B32B 5/06* (2006.01)
*B32B 5/02* (2006.01)
(Continued)

(52) U.S. Cl.
CPC .............. *B32B 5/073* (2021.05); *B32B 5/024* (2013.01); *B32B 5/263* (2021.05); *B32B 37/18* (2013.01);
(Continued)

(58) Field of Classification Search
CPC ......... B32B 5/073; B32B 5/263; B32B 5/024; B32B 5/12; B32B 5/26; B32B 7/09;
(Continued)

(56) References Cited

U.S. PATENT DOCUMENTS 4,786,541 A 11/1988 Nishimura et al.
2010/0021682 A1* 1/2010 Liang .................. D04H 1/4374 427/322

(Continued)

FOREIGN PATENT DOCUMENTS

JP S58-41950 A 3/1983
JP 2009-251609 A 10/2009

(Continued)

OTHER PUBLICATIONS

Carbon Naanotube Yarns and Sheets for Structural Components, accesed online Oct. 25, 2025.*

(Continued)

*Primary Examiner* — Camie S Thompson
(74) *Attorney, Agent, or Firm* — Rimon P.C.

(57) ABSTRACT

A carbon fiber reinforced plastic includes: a base portion including a plurality of stacked carbon fiber layers including carbon fibers arranged at least in a single direction; a resin with which the base portion is impregnated; and a carbon yarn, in which the carbon yarn penetrates the plurality of carbon fiber layers.

8 Claims, 6 Drawing Sheets

(51) Int. Cl.
*B32B 5/26* (2006.01)
*B32B 37/18* (2006.01)
*B32B 38/00* (2006.01)
*B32B 38/08* (2006.01)

(52) U.S. Cl.
CPC ........ *B32B 38/08* (2013.01); *B32B 2038/008* (2013.01); *B32B 2250/20* (2013.01); *B32B 2260/023* (2013.01); *B32B 2260/046* (2013.01); *B32B 2262/106* (2013.01); *B32B 2305/076* (2013.01); *B32B 2305/188* (2013.01); *B32B 2307/54* (2013.01); *B32B 2313/04* (2013.01); *B32B 2363/00* (2013.01)

(58) Field of Classification Search
CPC ........... B32B 3/08; B32B 37/18; B32B 38/08; B32B 2038/008; B32B 2250/20; B32B 2260/023; B32B 2260/046; B32B 262/106; B32B 2305/076; B32B 2305/188; B32B 2307/54; B32B 2313/04; B32B 2363/00; B29C 70/24; B29K 2105/08
See application file for complete search history.

(56) References Cited

U.S. PATENT DOCUMENTS

| | | | | |
|---|---|---|---|---|
| 2012/0231202 | A1 | 9/2012 | Takemura et al. | |
| 2013/0251619 | A1 | 9/2013 | Rikihisa et al. | |
| 2013/0316172 | A1* | 11/2013 | Shanov | C01B 32/174 427/458 |
| 2016/0200577 | A1 | 7/2016 | Cornwell et al. | |
| 2017/0370039 | A1 | 12/2017 | Kladitis et al. | |
| 2020/0307153 | A1 | 10/2020 | Yu et al. | |

FOREIGN PATENT DOCUMENTS

| | | | |
|---|---|---|---|
| JP | 2011-110796 | A | 6/2011 |
| JP | 2012-126635 | A | 7/2012 |
| JP | 2015-30950 | A | 2/2015 |
| JP | 2018-59009 | A | 4/2018 |
| JP | 2019-202547 | A | 11/2019 |

OTHER PUBLICATIONS

International Preliminary Report on Patentability issued in corresponding International Patent Application No. PCT/JP2022/003096, dated Aug. 15, 2023, with English translation.
International Search Report issued in corresponding International Patent Application No. PCT/JP2022/003096, dated Apr. 5, 2022, with English translation.
Extended European Search Report received in corresponding EP Patent Application No. 22752594.6, dated Nov. 26, 2024.
Office Action issued for the corresponding Japanese patent application No. 2022-581310 on Sep. 24, 2025.
Notice of Reasons for Rejection received in corresponding Japanese Patent Application No. 2022-581310, dated Jun. 23, 2026.

* cited by examiner

CARBON FIBER-REINFORCED PLASTIC AND PRODUCTION METHOD THEREFOR

CROSS REFERENCE TO RELATED APPLICATIONS

This patent application is the U.S. National Phase under 35 U.S.C. § 371 of International Application No. PCT/JP2022/003096, filed on Jan. 27, 2022, which claims the benefit of Japanese Patent Application No. 2021-021036, dated Feb. 12, 2021, and the entire contents of each are hereby incorporated by reference in their entirety.

TECHNICAL FIELD

The present invention relates to a carbon fiber reinforced plastic and a manufacturing method thereof.

BACKGROUND ART

A known carbon fiber reinforced plastic includes a plurality of stacked carbon fiber layers that are embedded in a resin body. As being light and strong as compared with aluminum or iron, such a carbon fiber reinforced plastic has attracted attention as a new material.

However, the carbon fiber reinforced plastic is disadvantageous in that a shear force vertically applied in a stacking direction of the carbon fiber layers is likely to cause so-called delamination.

To solve such a problem, for instance, Patent Literature 1 describes a carbon fiber reinforced plastic including a plurality of carbon fiber layers including carbon fibers, a resin body in which the carbon fiber layers are embedded, and pins inserted and fixed in a plurality of holes formed in the resin body in a manner to straddle the carbon fiber layers.

CITATION LIST

Patent Literature(s)

Patent Literature 1: JP 2011-110796 A

SUMMARY OF THE INVENTION

Problem(s) to be Solved by the Invention

However, manufacturing of a carbon fiber reinforced plastic according to Patent Literature 1 disadvantageously requires a step of forming a plurality of holes in a prepreg stacked body and a step of inserting pins into the holes.

An object of the invention is to provide a carbon fiber reinforced plastic in which delamination can be sufficiently reduced and a manufacturing method of the carbon fiber reinforced plastic.

Means for Solving the Problem(s)

According to an aspect of the invention, a carbon fiber reinforced plastic is provided, the carbon fiber reinforced plastic including: a base portion including a plurality of stacked carbon fiber layers each including carbon fibers arranged at least in a single direction; a resin with which the base portion is impregnated; and a carbon yarn, in which the carbon yarn penetrates the plurality of carbon fiber layers.

In the carbon fiber reinforced plastic according to the aspect of the invention, it is preferable that the resin with which the base portion is impregnated be a thermosetting resin, and the thermosetting resin be an epoxy resin.

In the carbon fiber reinforced plastic according to the aspect of the invention, it is preferable that the resin with which the base portion is impregnated be a thermoplastic resin, and the thermoplastic resin be at least one selected from the group consisting of a polyamide resin, a polypropylene resin, a polyphenylene sulfide resin, a polycarbonate resin, and a thermoplastic polyurethane resin.

In the carbon fiber reinforced plastic according to the aspect of the invention, it is preferable that the carbon yarn be at least one selected from the group consisting of a carbon nanotube yarn and a composite yarn, the composite yarn including the resin with which the base portion is impregnated and the carbon nanotube yarn.

In the carbon fiber reinforced plastic according to the aspect of the invention, it is preferable that an axial direction of the carbon fibers in at least one of the carbon fiber layers be not parallel with an axial direction of the carbon fibers in another one of the carbon fiber layers.

A method of manufacturing the carbon fiber reinforced plastic according to the aspect of the invention includes: stacking a plurality of prepregs, the prepregs each including one of the carbon fiber layers and a resin with which the carbon fiber layer is impregnated; and causing the carbon yarn to penetrate the plurality of carbon fiber layers.

A method of manufacturing the carbon fiber reinforced plastic according to the aspect of the invention includes: forming the base portion by stacking the plurality of carbon fiber layers; causing the carbon yarn to penetrate the plurality of carbon fiber layers; and impregnating the base portion with the resin.

In the method of manufacturing the carbon fiber reinforced plastic according to the aspect of the invention, it is preferable that a tensile strength of the carbon yarn be 500 MPa or more.

According to the aspect of the invention, it is possible to provide a carbon fiber reinforced plastic in which delamination can be sufficiently reduced and a manufacturing method of the carbon fiber reinforced plastic.

BRIEF DESCRIPTION OF DRAWING(S)

DESCRIPTION OF EXEMPLARY EMBODIMENT(S)

First Exemplary Embodiment

Description will be made below on the invention on the basis of the attached drawings by taking exemplary embodiments as examples. The invention is not limited to the contents of the exemplary embodiments. It should be noted that the drawings include a part illustrated at a larger or smaller scale for convenience of explanation.

Carbon Fiber Reinforced Plastic

Figure 1:
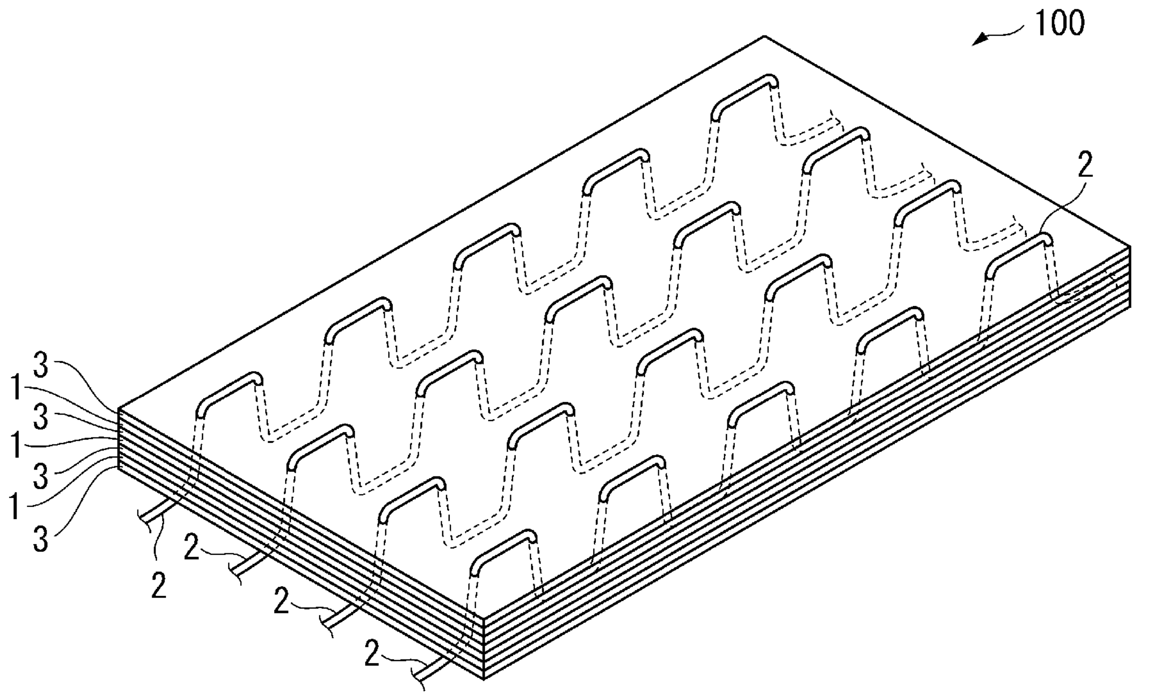
FIG. 1 is a schematic diagram illustrating a carbon fiber reinforced plastic according to a first exemplary embodiment of the invention.

A carbon fiber reinforced plastic 100 according to the exemplary embodiment includes a plurality of carbon fiber layers 1, a carbon yarn 2, and a plurality of resin layers 3 as illustrated in FIG. 1. The plurality of carbon fiber layers 1 provide a base portion. The resin layers 3 are layers including a resin with which the base portion is impregnated. Further, the carbon yarn 2 penetrates the plurality of carbon fiber layers 1 substantially in a vertical direction of the carbon fiber layers 1.

By virtue of such penetration of the carbon yarn 2 through the plurality of carbon fiber layers 1, a strength in the vertical direction of the carbon fiber layers 1, which is not reinforced by the carbon fiber layers 1, can be improved. In addition, the carbon fiber layers 1 can be fastened to each other with the carbon yarn 2. Delamination in the carbon fiber reinforced plastic 100 is thus sufficiently reducible.

Carbon Fiber Layer

Figure 2:
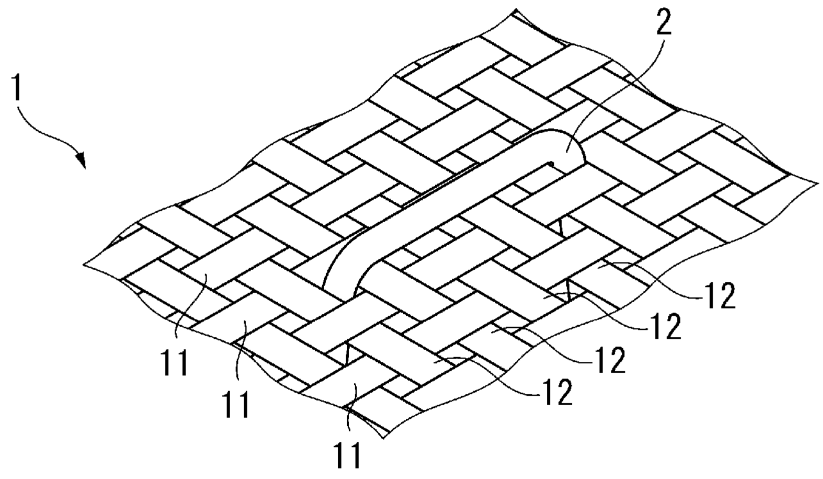
FIG. 2 is a schematic diagram illustrating a state where a carbon yarn penetrates carbon fiber layers in the first exemplary embodiment of the invention.

The carbon fiber layers 1 are each a layer including carbon fibers arranged at least in a single direction. The carbon fiber layers 1 may be carbon fiber cloth. Further, the carbon fiber layer 1 may be cloth woven from, for instance, warps 11 and wefts 12 as illustrated in FIG. 2.

It is only sufficient that the plurality of carbon fiber layers 1 are provided and the number of the layers may be two or three or more.

The carbon fibers are fibers made by carbonizing a precursor of an organic fiber by heat and carbon constitutes 90% or more of each carbon fiber in terms of mass ratio. The carbon fibers can be produced by carbonizing a material at a high temperature, the material including acrylic fiber or pitch (a by-product of petroleum, coal, coal tar, or the like).

Examples of the carbon fibers include a PAN carbon fiber (a carbon fiber using an acrylic fiber) and a pitch carbon fiber (a carbon fiber using pitch).

It is preferable that a thickness of each of the carbon fiber layers 1 be in a range from 100 μm to 5000 μm. The thickness of each of the carbon fiber layers 1 in the above range allows the carbon yarn 2 to easily penetrate the carbon fiber layers 1.

Carbon Yarn

The carbon yarn 2 is a yarn able to penetrate the plurality of carbon fiber layers 1 and that contains a fiber including a carbon material. It should be noted that the carbon yarn 2 does not contain the carbon fibers described above. The carbon fibers, a flexibility of which is not sufficient, are not usable for stitching as a thread. In contrast, regarding the carbon yarn 2, the carbon yarn 2 can be put through texture of the carbon fiber cloth as illustrated in FIG. 2, so that the plurality of carbon fiber layers 1 can be stitched with the carbon yarn 2.

By virtue of such a carbon yarn 2, all the materials of the base portion can be carbon materials to allow the strength of the base portion to be further improved.

Examples of the carbon yarn 2 include a carbon nanotube yarn and a carbon nanotube composite yarn (hereinafter, occasionally referred to as "CNT composite yarn") of another material and the carbon nanotube yarn.

The carbon nanotube yarn is a yarn-shaped linear body obtained by, for instance, drawing, from an end of a carbon nanotube forest (i.e., a grown body made by causing a plurality of carbon nanotubes to grow on a substrate such that the carbon nanotubes are oriented in a vertical direction relative to the substrate, occasionally referred to as "array"), the carbon nanotubes into a sheet shape, bundling the drawn carbon nanotube sheets, and then twisting the bundle of the carbon nanotubes. In addition to the above, the carbon nanotube yarn is also obtainable, for instance, by spinning from a dispersion liquid of carbon nanotubes. Manufacturing of a carbon nanotube linear body by spinning can be performed by, for instance, a method disclosed in US 2013/0251619 (JP 2012-126635 A). It is preferable that the carbon nanotube yarn be obtained by twisting the carbon nanotube sheets in terms of obtaining a highly pure carbon nanotube yarn. The carbon nanotube yarn may be a yarn made by twisting two or more carbon nanotube yarns together.

Examples of the CNT composite yarn include (1) a yarn made by providing, during a process to obtain a carbon nanotube yarn and that includes drawing the carbon nanotubes into a sheet shape from the end of the carbon nanotube forest, bundling the drawn carbon nanotube sheets, and then twisting the bundle of the carbon nanotubes, a resin film on a surface of the forest, sheet, or bundle of the carbon nanotubes or the twisted yarn, (2) a CNT composite yarn made by twisting a bundle of carbon nanotubes along with a yarn including another material, and (3) a CNT composite yarn made by twisting a carbon nanotube yarn or a CNT composite yarn along with a yarn including another material. Incidentally, the CNT composite yarn of (3) is a composite yarn made by braiding two yarns but may include three or more yarns twisted together, provided that at least one carbon nanotube or CNT composite yarn is included.

In a case where the CNT composite yarn is used as the carbon yarn 2, it is preferable that another material used for the CNT composite yarn be the resin with which the base portion is impregnated. By virtue of such a resin, which is the same as a resin in the later-described resin layers 3, the CNT composite yarn is likely to be impregnated with the resin in a case where the carbon fiber layers are to be impregnated with the resin after stitched with the CNT composite yarn.

In a case where the carbon yarn 2 is a twisted yarn, Z-twisting (left-twisting) is preferable. In a case where Z-twisting is applied, untwisting of the yarn is reducible during stitching with the carbon yarn 2 using an embroidery machine.

It is preferable that a tensile strength of the carbon yarn 2 be 500 MPa or more. A tensile strength of 500 MPa or more makes it possible to prevent a problem such as breaking of the yarn during stitching with the carbon yarn 2.

It is preferable that a diameter of the carbon yarn 2 (for a twisted yarn, a diameter of the twisted yarn) be in a range from 50 μm to 1000 μm. As long as the diameter of the carbon yarn 2 is in the above range, the carbon fiber layers 1 can be easily stitched with the carbon yarn 2.

Regarding a frequency for the carbon yarn 2 to penetrate the plurality of carbon fiber layers 1, it is preferable that, for instance, an average distance between adjacent penetrated spots be in a range from 0.1 mm to 500 mm. As long as the average distance is in the above range, the strength in the vertical direction of the carbon fiber layers 1 can be improved.

Resin Layer

The resin layers 3 each include a resin with which the base portion is impregnated. The resin layers 3 serve as a resin of the carbon fiber reinforced plastic 100 and this resin is reinforced by the base portion including the carbon fiber layer 1 and the carbon yarn 2. Examples of a method of impregnating the base portion with the resin include (1) a method including impregnating the carbon fiber layers 1 with a resin by immersing the carbon fiber layers 1 in the resin, taking the carbon fiber layers 1 out of the resin, and then drying the carbon fiber layers 1 to produce prepregs and stacking the prepregs, (2) a method including producing a base portion and impregnating the base portion with a resin by immersing the base portion in the resin, taking the base portion out of the resin, and then drying the base portion, and (3) a method including producing a base portion and impregnating the base portion with a resin by placing the base portion in a mold and pouring the resin into the mold.

Here, examples of the resin include a thermosetting resin and a thermoplastic resin.

Examples of the thermosetting resin include an epoxy resin, a polyester resin, a phenol resin, and a thermosetting polyimide resin. Among the above, an epoxy resin is preferable in terms of strength and the like.

Examples of the thermoplastic resin include a polyamide resin, a polypropylene resin, a polyphenylene sulfide resin, a polycarbonate resin, and a thermoplastic polyurethane resin.

It is preferable that a thickness of each of the resin layers 3 be in a range from 10 μm to 1000 μm. The thickness of each of the resin layers 3 in the above range allows the carbon yarn 2 to easily penetrate the resin layers 3.

Manufacturing Method of Carbon Fiber Reinforced Plastic

Next, description will be made on a manufacturing method of a carbon fiber reinforced plastic according to the exemplary embodiment.

Figure 3A:
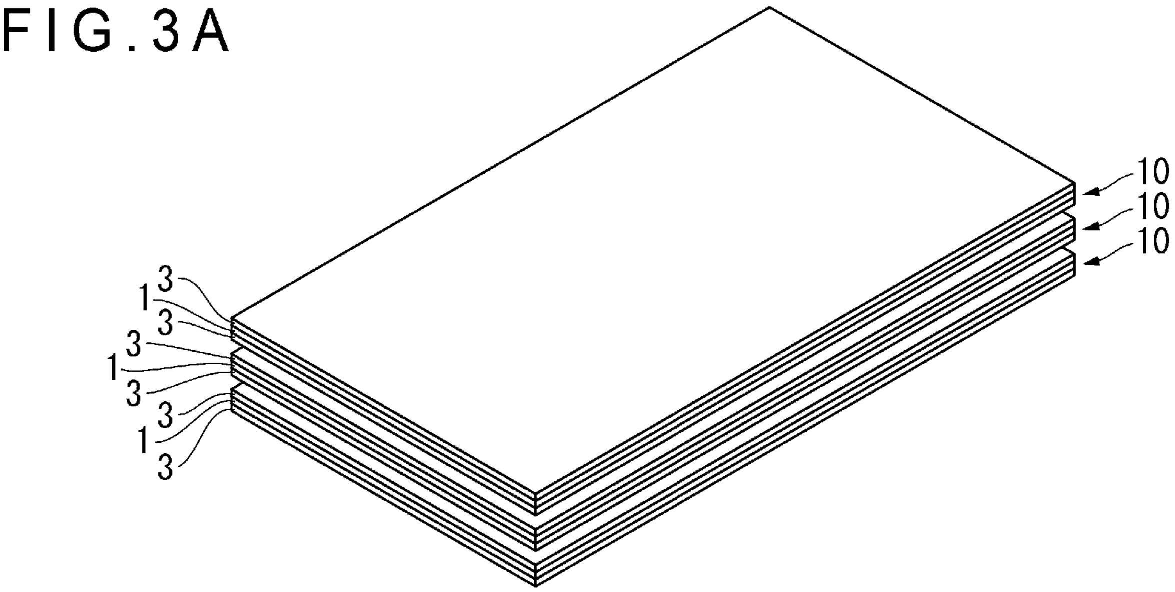
FIG. 3A is a diagram for explaining a manufacturing method of the carbon fiber reinforced plastic according to the first exemplary embodiment of the invention.
Figure 3B:
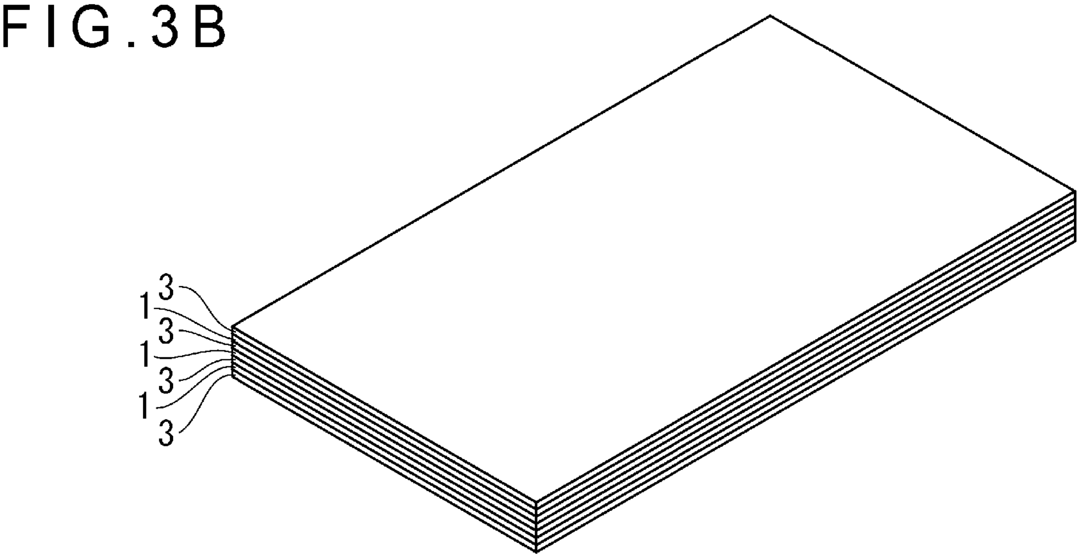
FIG. 3B is a diagram for explaining the manufacturing method of the carbon fiber reinforced plastic according to the first exemplary embodiment of the invention.
Figure 3C:
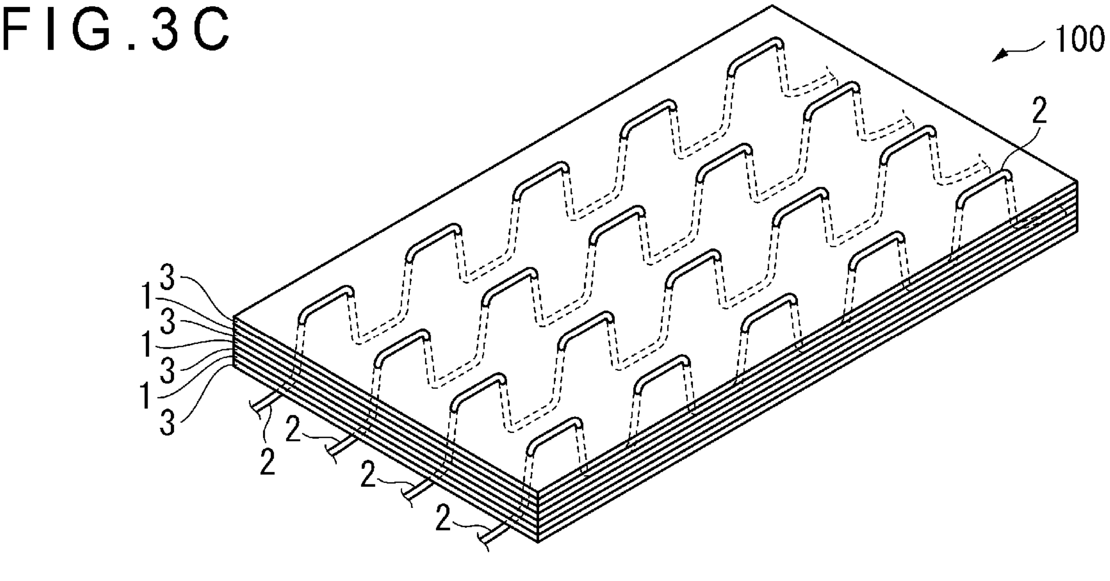
FIG. 3C is a diagram for explaining the manufacturing method of the carbon fiber reinforced plastic according to the first exemplary embodiment of the invention.

The manufacturing method of a carbon fiber reinforced plastic according to the exemplary embodiment is a method of manufacturing the carbon fiber reinforced plastic 100 according to the exemplary embodiment as illustrated in FIG. 3A to FIG. 3C, the method including stacking a plurality of prepregs 10 each including the carbon fiber layer 1 and the resin layers 3 (a stacking step) and causing the carbon yarn 2 to penetrate the plurality of carbon fiber layers 1 (a penetration step).

In the stacking step, the prepregs 10 as illustrated in FIG. 3A are first prepared.

The prepregs 10 can be each produced by impregnating the carbon fiber layer 1 with a resin to form the resin layers 3 such that the carbon fiber layer 1 is covered with the resin layers 3. In a case where the resin usable here is a thermosetting resin, an uncured thermosetting resin is used.

Subsequently, in the stacking step, the plurality of prepregs 10 are stacked as illustrated in FIG. 3B. The base portion including the plurality of stacked carbon fiber layers 1 is formed in this manner. In addition, the base portion is impregnated with the resin and a periphery of the base portion is also covered with the resin layers 3.

In the penetration step, the plurality of carbon fiber layers 1 are penetrated by the carbon yarn 2 as illustrated in FIG. 3C. In this regard, the carbon yarn 2 is caused to penetrate the base portion, which includes the plurality of stacked carbon fiber layers 1, from a lower surface to an upper surface, and further caused to penetrate from the upper surface to the lower surface after moved in a plane direction of the base portion. The base portion can be stitched with the carbon yarn 2 in this manner.

A known method is applicable as a method of causing the carbon yarn 2 to penetrate the carbon fiber layers 1 as appropriate. Specifically, stitching may be performed by hand or using a machine. Examples of a machine usable here include a sewing machine and an embroidery machine.

In a case where the resin is a thermosetting resin, the method may include curing the thermosetting resin after the penetration step.

By virtue of curing the thermosetting resin after the penetration step as above, the base portion, which is uncured in the penetration step, can be easily stitched with the carbon yarn 2.

Workings and Effects of First Exemplary Embodiment

According to the exemplary embodiment, the following workings and effects are achievable.

(1) In the exemplary embodiment, it is possible to improve a strength in the vertical direction of the carbon fiber layers 1, which is not reinforced by the carbon fiber layers 1, by virtue of penetration of the carbon yarn 2 through the plurality of carbon fiber layers 1. In addition, the carbon fiber layers 1 can be fastened to each other with the carbon yarn 2. Delamination in the carbon fiber reinforced plastic 100 can be sufficiently reduced in this manner.

(2) In the exemplary embodiment, a concern such as melting of the carbon yarn 2 by heat is eliminated, which allows the strength of the base portion to be further improved.

(3) In the exemplary embodiment, the thermosetting resin is cured after the penetration step. By virtue of such a configuration, the base portion, which is uncured in the penetration step, can be easily stitched with the carbon yarn 2.

Second Exemplary Embodiment

Subsequently, description will be made on a second exemplary embodiment of the invention with reference to the attached drawings.

The exemplary embodiment is similar in configuration to the first exemplary embodiment except that a manufacturing method of a carbon fiber reinforced plastic is different; therefore, the manufacturing method will be described and description on any other common part with the foregoing description will be omitted.

Figure 4A:
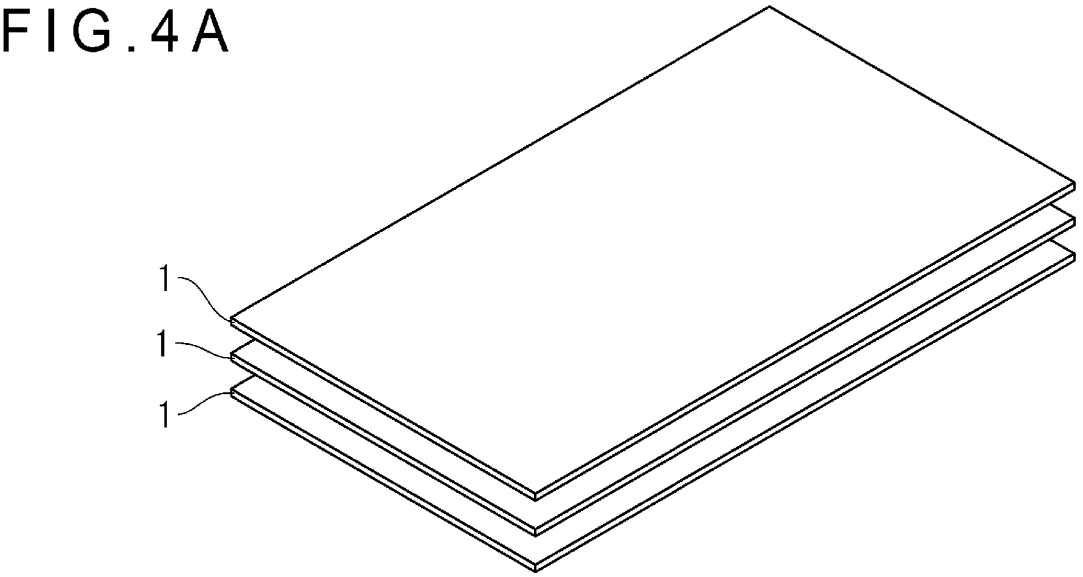
FIG. 4A is a diagram for explaining a manufacturing method of the carbon fiber reinforced plastic according to a second exemplary embodiment of the invention.
Figure 4B:
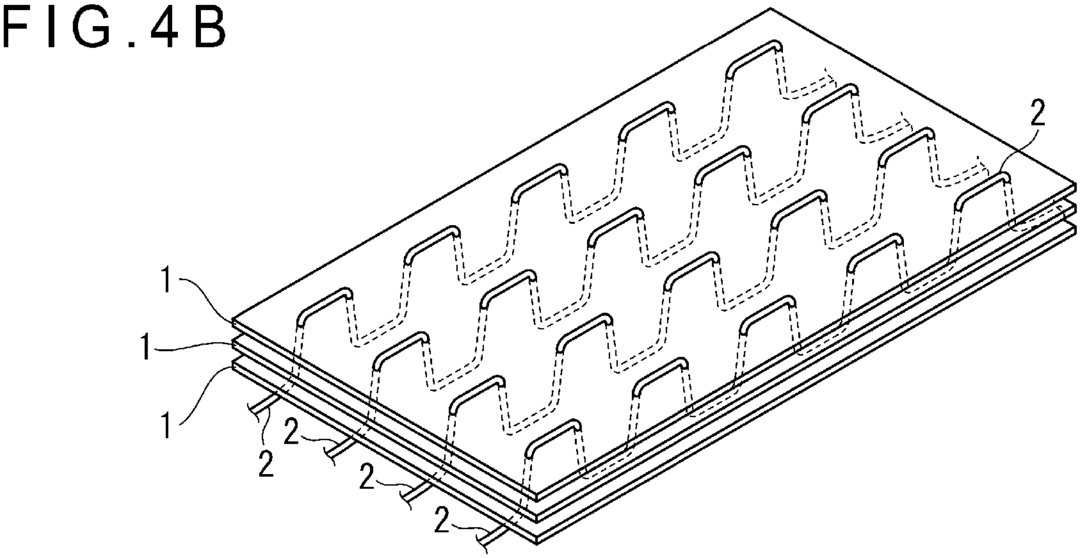
FIG. 4B is a diagram for explaining the manufacturing method of the carbon fiber reinforced plastic according to the second exemplary embodiment of the invention.
Figure 4C:
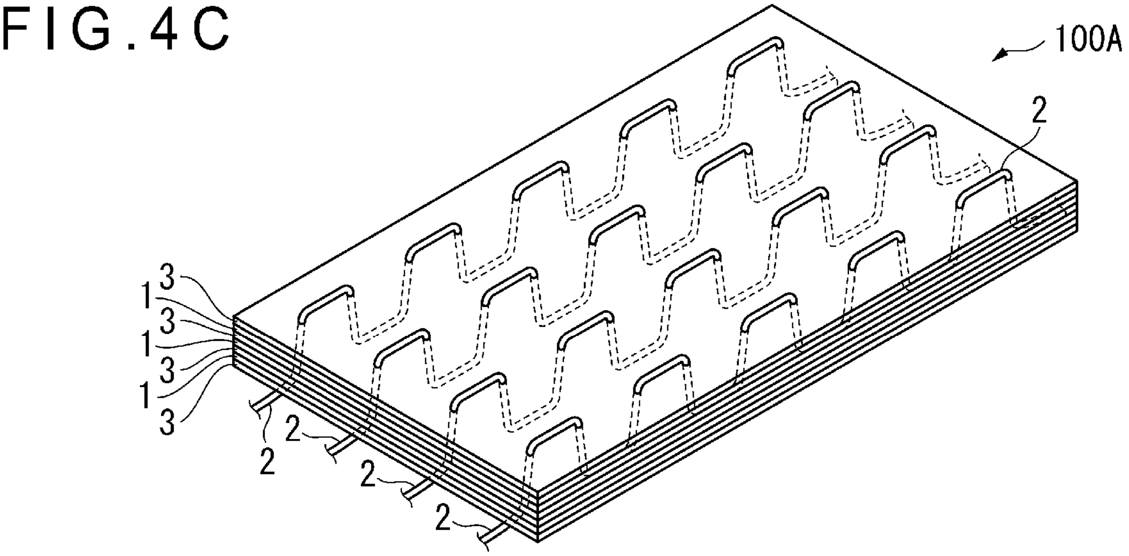
FIG. 4C is a diagram for explaining the manufacturing method of the carbon fiber reinforced plastic according to the second exemplary embodiment of the invention.

The manufacturing method of a carbon fiber reinforced plastic according to the exemplary embodiment is a method of manufacturing a carbon fiber reinforced plastic 100A according to the exemplary embodiment as illustrated in FIG. 4A to FIG. 4C, the method including stacking the plurality of carbon fiber layers 1 to form a base portion (a base portion formation step), causing the carbon yarn 2 to penetrate the plurality of carbon fiber layers 1 (a penetration step), and impregnating the base portion with a resin (an impregnation step).

In the base portion formation step, the base portion is formed by stacking the plurality of carbon fiber layers 1 as illustrated in FIG. 4A.

In the penetration step, the plurality of carbon fiber layers 1 are penetrated by the carbon yarn 2 as illustrated in FIG. 4B. Then, the carbon yarn 2 is caused to penetrate the base portion, which includes the plurality of stacked carbon fiber layers 1, from a lower surface to an upper surface, and further caused to penetrate from the upper surface to the lower surface after moved in a plane direction of the base portion. The base portion can be stitched with the carbon yarn 2 in this manner.

In the impregnation step, the base portion is impregnated with the resin as illustrated in FIG. 4C. The base portion is thus impregnated with the resin to form the resin layers 3 and, additionally, the periphery of the base portion is covered with the resin layers 3.

Workings and Effects of Second Exemplary Embodiment

According to the exemplary embodiment, the following working and effect (4) are achievable in addition to the workings and effects (1) and (2) of the above first exemplary embodiment.

(4) In the exemplary embodiment, the carbon yarn 2 is caused to penetrate the base portion impregnated with no resin. The base portion can thus be easily stitched with the carbon yarn 2.

Third Exemplary Embodiment

Subsequently, description will be made on a third exemplary embodiment of the invention with reference to the attached drawings.

The exemplary embodiment is similar in configuration to the first exemplary embodiment except a location of the plurality of carbon fiber layers 1 in the base portion; therefore, a modification will be described and description on any other common part with the foregoing description will be omitted.

Figure 5:
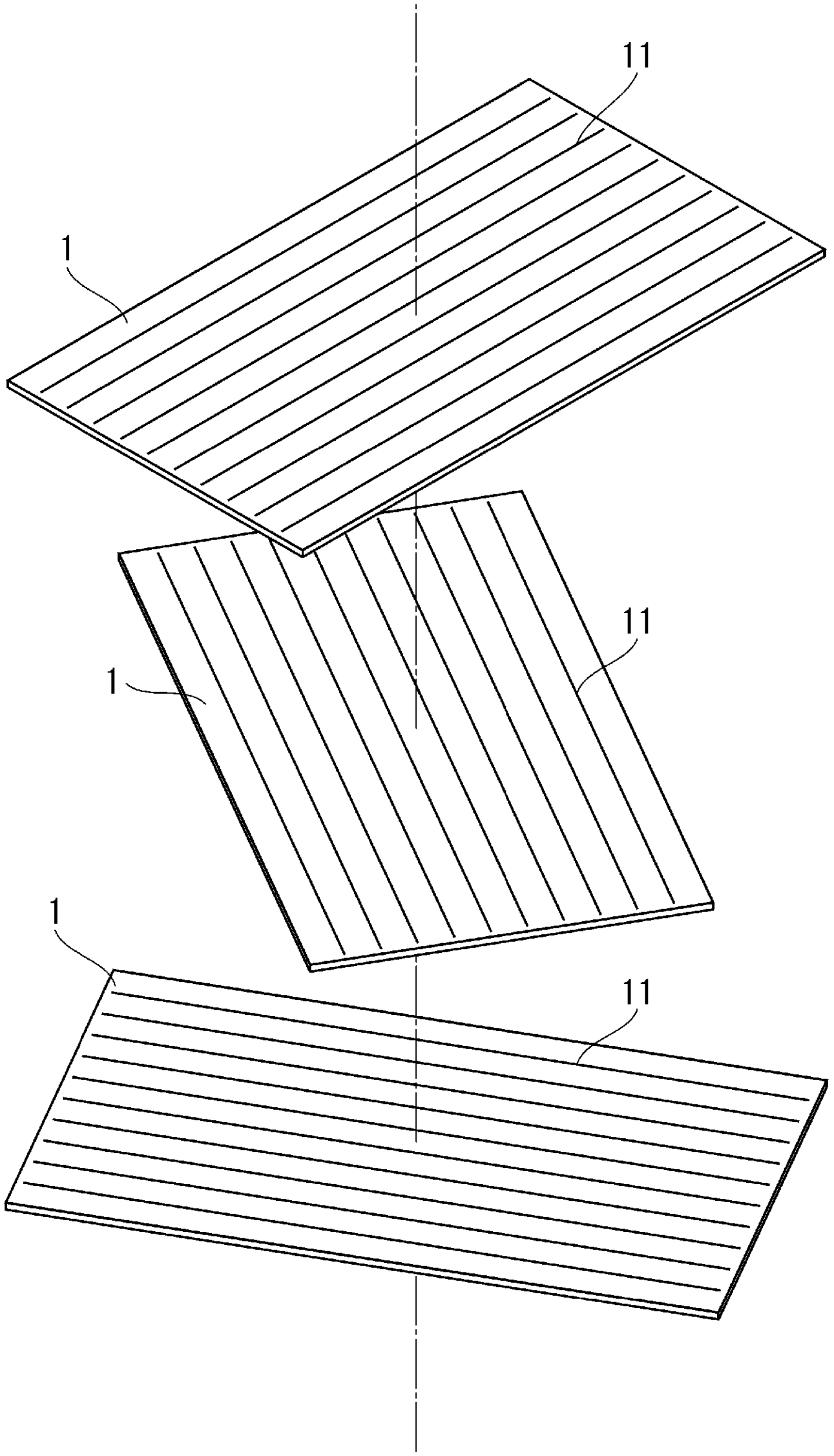
FIG. 5 is a schematic diagram illustrating a plurality of carbon fiber layers with axial directions of carbon fibers being not parallel in a third exemplary embodiment of the invention.

In the exemplary embodiment, an axial direction of the carbon fibers (an axial direction of the warps 11) in at least one of the carbon fiber layers 1 is not parallel with an axial direction of the carbon fibers (an axial direction of the warps 11) in another one of the carbon fiber layers as illustrated in FIG. 5.

In the base portion, a strength in the axial direction of the carbon fibers is high as compared with strengths in the other directions. Here, alignment of the axial directions of the carbon fibers in the base portion would make a strength in the single direction high while making strengths in the other directions low. In contrast, arrangement of the carbon fiber layers 1 in the base portion as illustrated in FIG. 5 makes it possible to increase strengths in a variety of directions.

Workings and Effects of Third Exemplary Embodiment

According to the exemplary embodiment, the following working and effect (5) are achievable in addition to the workings and effects (1) to (3) of the above first exemplary embodiment.

(5) In the exemplary embodiment, the axial direction of the warps 11 in at least one of the carbon fiber layers 1 is not parallel with the axial direction of the warps 11 in another one of the carbon fiber layers. This makes it possible to increase the strengths in the variety of directions in the carbon fiber reinforced plastic 100.

Modifications of Exemplary Embodiments

The invention is not limited to the above exemplary embodiments and modifications, alterations, and the like are within the scope of the invention as long as an object of the invention is achievable.

For instance, in the above exemplary embodiment, a stitching pattern for stitching the base portion with the carbon yarn 2 is a running stitch but this is not limiting. The stitching pattern may be a back stitch or any one of various stitches (overcast, cross stitch, chain stitch, blanket stitch, knot, and the like).

Figure 6A:
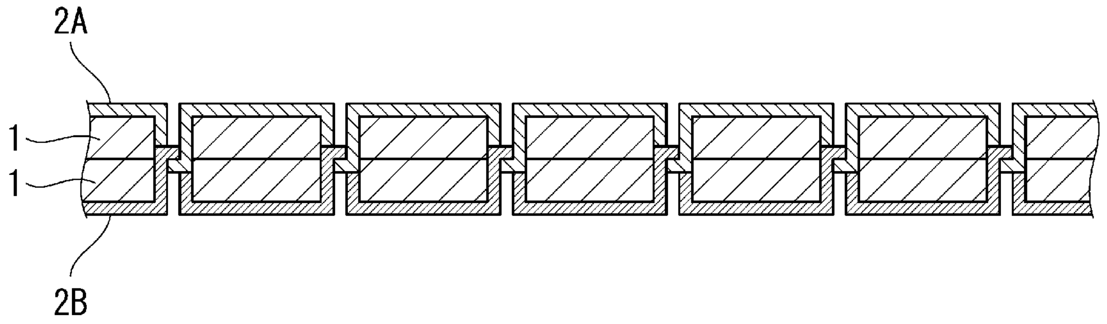
FIG. 6A is a schematic diagram illustrating a state where the plurality of carbon fiber layers are stitched with two carbon yarns.
Figure 6B:
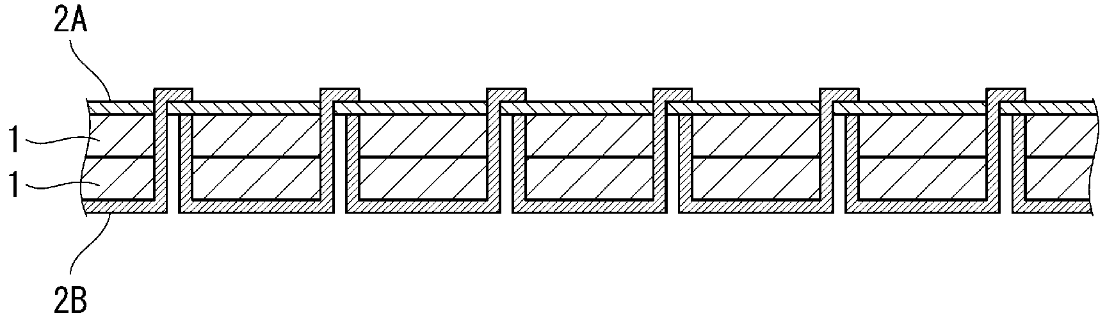
FIG. 6B is a schematic diagram illustrating a state where the plurality of carbon fiber layers are stitched with the two carbon yarns.
Figure 6C:
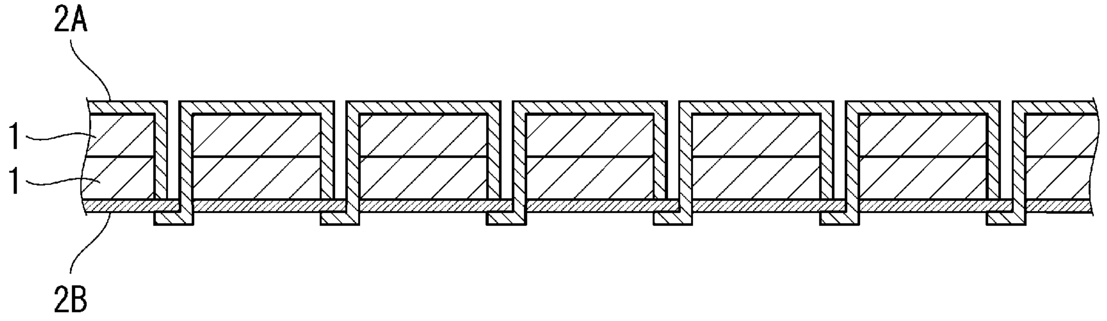
FIG. 6C is a schematic diagram illustrating a state where the plurality of carbon fiber layers are stitched with the two carbon yarns.

In the above exemplary embodiment, the plurality of carbon fiber layers 1 are stitched with the single carbon yarn 2 but this is not limiting. The plurality of carbon fiber layers 1 may be stitched with two or more carbon yarns 2. For instance, FIG. 6A to FIG. 6C are schematic diagrams illustrating states where the plurality of carbon fiber layers 1 are stitched by using two carbon yarns 2 (an upper yarn 2A and a lower yarn 2B). In a case where strengths of the upper yarn 2A and the lower yarn 2B are almost the same, both the upper yarn 2A and the lower yarn 2B penetrate the carbon fiber layers 1 as illustrated in FIG. 6A. For instance, in a case where the upper yarn 2A is stronger than the lower yarn 2B, only the lower yarn 2B is allowed to penetrate the carbon fiber layers 1 as illustrated in FIG. 6B. Likewise, in a case where the lower yarn 2B is stronger than the upper yarn 2A, only the upper yarn 2A is allowed to penetrate the carbon fiber layers 1 as illustrated in FIG. 6C.

The invention claimed is:

1. A carbon fiber reinforced plastic comprising:

a base portion comprising a plurality of stacked carbon fiber layers, the carbon fiber layers each comprising carbon fibers arranged at least in a single direction;

a resin with which the base portion is impregnated; and a carbon yarn, wherein the carbon yarn is a yarn made by twisting two or more carbon nanotube yarns together, and the yarn made by twisting the two or more carbon nanotube yarns together is a Z-twist yarn, a thickness of each of the carbon fiber layers is in a range from 100 μm to 5000 μm, a diameter of the carbon yarn is in a range from 50 μm to 1000 μm, and the carbon yarn penetrates the plurality of carbon fiber layers.

2. The carbon fiber reinforced plastic according to claim 1, wherein the resin with which the base portion is impregnated comprises a thermosetting resin, and the thermosetting resin comprises an epoxy resin.

3. The carbon fiber reinforced plastic according to claim 1, wherein the resin with which the base portion is impregnated comprises a thermoplastic resin, and the thermoplastic resin comprises at least one selected from the group consisting of a polyamide resin, a polypropylene resin, a polyphenylene sulfide resin, a polycarbonate resin, and a thermoplastic polyurethane resin.

4. The carbon fiber reinforced plastic according to claim 1, wherein an axial direction of the carbon fibers in at least one of the carbon fiber layers is not parallel with an axial direction of the carbon fibers in another one of the carbon fiber layers.

5. A method of manufacturing the carbon fiber reinforced plastic according to claim 1, the method comprising:

stacking a plurality of prepregs, the prepregs each comprising one of the carbon fiber layers and a resin with which the carbon fiber layer is impregnated; and causing the carbon yarn to penetrate the plurality of carbon fiber layers.

6. The method of manufacturing the carbon fiber reinforced plastic according to claim 5, wherein a tensile strength of the carbon yarn is 500 MPa or more.

7. A method of manufacturing the carbon fiber reinforced plastic according to claim 1, the method comprising:

forming the base portion by stacking the plurality of carbon fiber layers;

causing the carbon yarn to penetrate the plurality of carbon fiber layers; and impregnating the base portion with the resin.

8. The method of manufacturing the carbon fiber reinforced plastic according to claim 7, wherein a tensile strength of the carbon yarn is 500 MPa or more.

* * * * *